United States Patent [19]

Uehlinger

[11] 4,165,314
[45] Aug. 21, 1979

[54] MIXTURES OF 1:2 COBALT COMPLEXES OF MONOAZO COMPOUNDS HAVING AN ACETOACETANILIDE COUPLING COMPONENT RADICAL

[75] Inventor: Hanspeter Uehlinger, Basel, Switzerland

[73] Assignee: Sandoz Ltd., Basel, Switzerland

[21] Appl. No.: 812,826

[22] Filed: Jul. 5, 1977

[30] Foreign Application Priority Data

Jul. 12, 1976 [CH] Switzerland ............... 8903/76

[51] Int. Cl.² .................................... C09B 45/20
[52] U.S. Cl. ..................... 260/145 A; 260/149; 260/193
[58] Field of Search .................. 260/145 A, 149

[56] References Cited

U.S. PATENT DOCUMENTS

| | | | |
|---|---|---|---|
| 2,734,895 | 2/1956 | Zickendraht et al. | 260/145 A X |
| 2,897,189 | 7/1959 | Fasciati | 260/149 X |

FOREIGN PATENT DOCUMENTS

1351192  12/1963  France .................. 260/145 A

*Primary Examiner*—Charles F. Warren
*Attorney, Agent, or Firm*—Gerald D. Sharkin; Richard E. Vila; Melvyn M. Kassenoff

[57] ABSTRACT

Mixtures of symmetrical and asymmetrical 1:2 cobalt complexes of compounds of the formulae

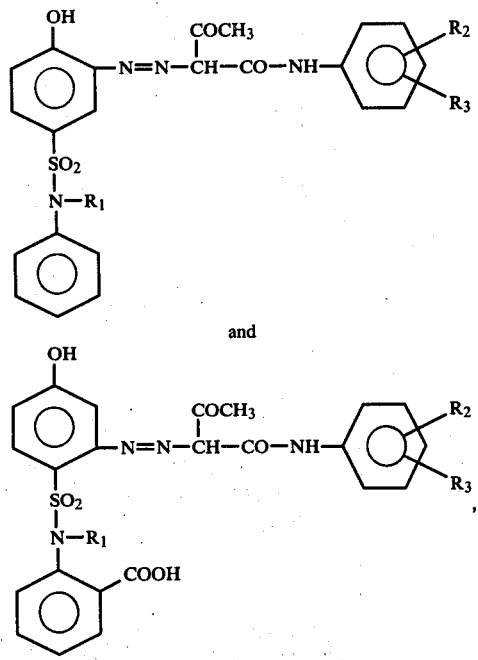

and wherein,
each $R_1$, independently, is hydrogen or $(C_{1-4})$alkyl, and
each $R_2$ and $R_3$, independently, is hydrogen, halogen, $(C_{1-4})$alkyl or $(C_{1-4})$alkoxy, which complexes are optionally in salt form and which mixtures are useful for dyeing or printing substrates dyeable with anionic dyes, e.g., natural and synthetic polyamides such as wool, silk and nylon, polyurethanes, polyolefins modified to contain basic groups, leather and metals such as anodically oxidized aluminum.

28 Claims, No Drawings

MIXTURES OF 1:2 COBALT COMPLEXES OF MONOAZO COMPOUNDS HAVING AN ACETOACETANILIDE COUPLING COMPONENT RADICAL

The present invention relates to metal complex mixtures, their production and use.

Accordingly, the present invention provides a mixture of symmetrical and asymmetrical 1:2 cobalt complexes of the compounds of formulae I and II,

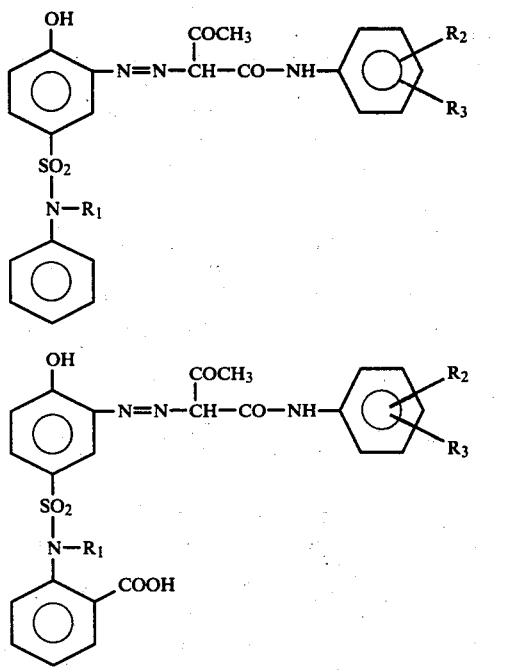

in which compounds,
each $R_1$, independently, is hydrogen or $(C_{1-4})$alkyl, and
each $R_2$ and $R_3$, independently, is hydrogen, halogen, $(C_{1-4})$alkyl or $(C_{1-4})$alkoxy,
which complexes are optionally in salt form.

Preferably, the mixture contains the compounds of formulae I and II in a molar ratio range of from 80:20 to 20:80, more preferably 30:70 to 70:30, even more preferably 40:60 to 60:40, with a ration of 1:1 being most preferred.

Where any of $R_1$, $R_2$ and/or $R_3$ is $(C_{1-4})$alkyl, such alkyl may be straight chain or branched and is preferably methyl or ethyl, with methyl being especially preferred.

Where any $R_2$ and/or $R_3$ is $(C_{1-4})$alkoxy, such alkoxy is preferably methoxy or ethoxy.

By halogen is meant fluorine, chlorine or bromine. The preferred halogen is chlorine.

Preferably, the $R_1$'s are $R_1''$s, where each $R_1'$, independently, is hydrogen or methyl. More preferably, $R_1$ is hydrogen.

Preferably, the $R_2$'s are $R_2''$s, where each $R_2'$, independently, is hydrogen, chlorine, methyl, methoxy or ethoxy. More preferably, the $R_2$'s are $R_2'''$s, where each $R_2''$, independently, is hydrogen, methyl, methoxy or chlorine. Most preferably, each $R_2$ is hydrogen.

The $R_3$'s are preferably $R_3''$s, where each $R_3'$, independently, has one of the significances of $R_2'$. More preferably, the $R_3$'s are $R_3'''$s, where each $R_3''$, independently, has one of the significances of $R_2''$. Most preferably, each $R_3$ is hydrogen.

Where an $R_2/R_3$ bearing phenyl ring is monosubstituted, each substituent is preferably chlorine, methyl, methoxy or ethoxy. Where a phenyl ring is disubstituted, each substituent $R_2$ and $R_3$, independently, is preferably chlorine, methyl or methoxy. The substituents are preferably in the 2,4-, 2,5-, 2,6- or 3,4-positions, with the 2,5- and 2,6-positions being most preferred.

Preferred mixtures of complexes are those in which, in the compounds of formulae I and II, the $R_1$'s are $R_1''$s, the $R_2$'s are $R_2''$s and the $R_3$'s are $R_3''$s. More preferred mixtures are those in which, in the compounds of formulae I and II, the $R_2$'s are $R_2'''$s, more preferably hydrogen, and the $R_3$'s are $R_3'''$s, of these mixtures, those in which each $R_1$ is hydrogen are especially preferred. Still more preferred mixtures are those in which the $R_1$'s are $R_1''$s, the $R_2$'s are $R_2'''$s and the $R_3$'s are $R_3''$s, especially $R_3'''$s; of these, those in which each $R_2$ is hydrogen and the $R_3$'s are $R_3'''$s, particularly those in which each $R_1$ and $R_2$ is hydrogen and the $R_3$'s are $R_3'''$s and more particularly those in which each $R_1$, $R_2$ and $R_3$ is hydrogen, are preferred. The most preferred mixtures in which each $R_1$, $R_2$ and $R_3$ is hydrogen are those formed from a mixture of compounds of formulae I and II in a 1:1 molar ratio. Most preferred mixtures are those in which $R_2$ is $R_3$ and the $R_2$'s are $R_2''$s, more preferably $R_2'''$s, especially hydrogen.

The present invention also provides a process for the production of a mixture of symmetrical and asymmetrical 1:2 cobalt complexes of the compounds of formulae I and II, comprising reacting a mixture of the compounds of formulae I and II with a cobalt-donating compound.

The metallisation of the mixture of monoazo compounds of formulae I and II may be carried out in accordance with conventional methods. It is preferred that the molar ratio of the mixture of compounds I and II to cobalt-donating compound is 2:1. Suitable cobalt donating compounds are cobalt(II)-sulphate, -acetate, -formate and -chloride.

It is preferred to employ the compounds of formula I and formula II in a 1:1 molar ratio.

The mixture of 1:2 cobalt complexes obtained may be isolated in accordance with known methods; for example, the product may be salted out with an alkali metal salt or a weak acid, filtered, washed with an alkali metal salt solution and dried. The product obtained contains symmetrical and asymmetrical complexes in a relationship dependent upon the ratio of the compound of formula I to that of the compound of formula II employed.

Depending on the reaction and isolation conditions, the mixture of 1:2 cobalt complexes which may be obtained may be in salt form. The complex anion-neutralising cation may be any non-chromophoric cation, for example, an alkali metal cation, such as lithium, sodium or potassium (preferably sodium); an unsubstituted, lower alkyl substituted or hydroxyalkyl substituted ammonium ion represented by the formula $N^{\oplus}(R_5)_4$, where each $R_5$ is, independently, hydrogen, $(C_{1-3})$alkyl or $\beta$-, $\gamma$- or $\delta$-hydroxy$(C_{2-4})$alkyl. It will be appreciated that groups which would cause steric or stability problems for example, tetraolkanolannonium would not be present in the complexes of the mixtures. As examples of substituted ammonium ions may be given mono-, di-, tri- and tetramethylammonium, triethanolammonium and mono-, di- and triethanolammonium. Similarly, the cation of the carboxy group may be any one of those indicated above for the complex anion-neutralizing cation and may be the same as or different therefrom. Preferably, the cation of the carboxylic acid group and the complex anion-neutralizing cation are the same; most preferably they are both sodium.

The monoazo compounds of formulae I and II are known or may be prepared in analogy with known methods from available starting materials. Preferably, the mixture of compounds of formulae I and II are prepared by diazotizing a mixture of amines of formulae III and IV,

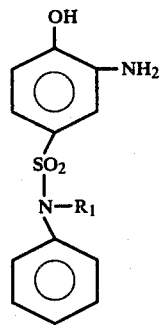

III

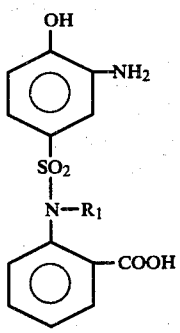

IV in the desired ratio and coupling the diazonium mixture with a compound of formula V,

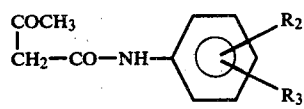

V or a mixture thereof, under alkaline conditions.

The product obtained may be directly metallized.

The mixtures of 1:2 cobalt complexes according to the present invention are well soluble in water and are useful for dyeing or printing substrates dyeable with anionic dyes. Suitable substrates are natural and synthetic polyamides such as wool, silk and nylon; synthetic polyamides in the mass; polyurethanes; basic modified polyolefins; leather and metals such as anodically oxidised aluminum. The dyes are also useful for cross wound bobbin dyeing (cheese dyeing).

The mixtures according to the present invention may be employed for dyeing as such or may be made up into liquid or solid preparations.

Preferably, water-soluble organic solvents, optionally mixed with water, are used for the liquid preparations which are in the form of stable concentrated stock solutions; conventional additives such as dissolving agents (e.g. urea or alkali reacting organic or inorganic substances) may be added thereto. The stock solutions may be diluted with water. Such preparations may be made, for example, in accordance with the procedure described in German Pat. No. 1,619,470 or in German patent application No. 2,033,989. Also concentrated stable aqueous preparations which contain conventional additives may be used.

Solid preparations which are in powder or granulate form with an average particle size of at least 20μ can be used, which preparations contain conventional additives such as standardization agents. Such solid preparations may be made, for example, in accordance with the procedure described in British Pat. No. 1,370,845. The solid preparations are well soluble in water.

Further, the mixtures according to the present invention may be made up into preparations which are dispersable in cold water. For the preparation of such dispersions the dye mixture may be ground wet or dry to a particle size of less than 20μ, preferably 1–5μ, in the presence of one or more conventional anionic dispersing agents and optionally in the presence of a non-ionic dispersing agent, with or without subsequent spray drying. The preparations so obtained are finely dispersed in cold water and are thus easy to handle.

The dyestuff mixtures according to the invention give dyeings which have notable light fastness, wet fastness (wash, water, sea-water, acid- and alkali-sweat and milling fastnesses), ironing fastness, fastness to solvents, wet and dry rubbing fastness, fastness to chlorine, carbonization fastness and fastness to decatizing. The dyestuffs are not adversely affected by electrolytes or chalk.

The dyestuff mixtures according to the invention exhaust from a neutral bath and build-up well on polyamide fibres. They have generally good build-up power and build-up equally on natural and synthetic polyamides when dyed in the same dyebath. They are also suitable for dyeing in combination with other asymmetric or symmetric 1:2 metal complex dyestuffs, for example C.I. Acid Brown 363, C.I. Acid Blue 296 and C.I. Acid Green 106. The dyeings obtained with such combinations exhibit notable light fastness.

The following Examples further serve to illustrate the invention. In the Examples the temperatures are in degrees Centigrade and the parts are by weight.

EXAMPLE 1

39.6 parts of 2-amino-1-hydroxybenzene-4-sulphonic acid-N-phenylamide and 46.2 parts of 2-amino-1-hydroxybenzene-4-sulphonic acid-N-phenylamide-2'-carboxylic acid are dissolved at 65° in 700 parts water with the addition of a 30% sodium hydroxide solution and are reacted with 20.7 parts sodium nitrite. The solution, cooled to 0°–5°, is added dropwise over a period of 1 hour to 115 parts of a 30% hydrochloric acid and 80 parts of ice, the temperature being maintained at 0°–5° by the addition of further ice.

53.1 parts of acetoacetanilide are stirred to a fine suspension in 200 parts of a 20% sodium carbonate solution and are added to the diazo suspension over a period of 15 minutes. After 1½ hours coupling is completed and the monoazo dyestuff mixture is filtered.

For metallization, the paste of the monoazo dyestuffs is stirred in 1500 parts of water and adjusted to a pH of 10 with 50 parts of a 30% sodium hydroxide solution. At a temperature of 50°–60°, a solution of 42.2 parts cobalt(II)sulphate in 150 parts water is added dropwise thereto, the pH being maintained at 10 by the addition of further sodium hydroxide. After metallization, the 1:2 cobalt complex mixture is salted out with sodium chloride, isolated by filtering, dried and ground. The dyestuff mixture obtained in the form of the sodium salt comprises complexes of a mixture of compounds (I) and (II) of general the formula

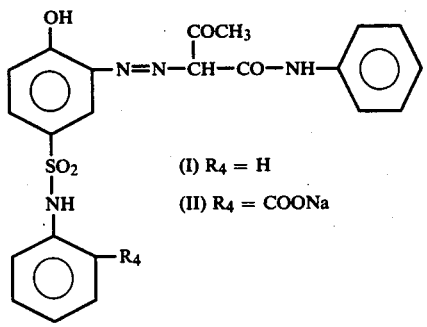

(I) $R_4 = H$
(II) $R_4 = COONa$ in a 1:1 molar ratio. The mixture contains two symmetrical 1:2 cobalt complexes (a 1:2 complex of (I)/(I) and a 1:2 complex of (II)/(II)) and an asymmetrical 1:2 cobalt complex of the compounds (I) and (II).

The dyestuff mixture is well soluble in water and dyes natural and synthetic polyamide fibres in reddish-yellow shades. The dyeings have notable wet- and light-fastnesses.

In accordance with the procedure described in Example 1, further dyestuff 1:2 cobalt complex mixtures may be prepared which comprises complexes of monoazo dyes having the diazo components of compounds (I) and (II) of Example 1 and both having the same coupling component of formula V,

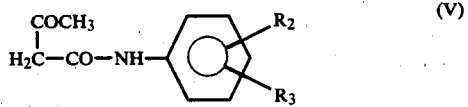

(V)

in a 1:1 ratio. The significances of $R_2$ and $R_3$ and the positions of the substituents are given in Table 1. The dyestuffs give dyeings of reddish-yellow shades on natural and synthetic polyamide fibres which dyeings possess wet and light-fastnesses comparable with those of the dyeings of the dyestuff mixture of Example 1.

Table 1

| Example No. | $R_2$ (position) | $R_3$ (position) |
|---|---|---|
| 2 | H | Cl (2) |
| 3 | H | Cl (3) |
| 4 | H | Cl (4) |
| 5 | H | $CH_3$ (3) |
| 6 | Cl (2) | Cl (5) |
| 7 | Cl (2) | $CH_3$ (6) |
| 8 | H | $OCH_3$ (2) |
| 9 | H | $OC_2H_5$ (4) |
| 10 | H | $C_2H_5$ (2) |
| 11 | $OCH_3$ (2) | $OCH_3$ (5) |
| 12 | $OCH_3$ (2) | $CH_3$ (5) |
| 13 | $CH_3$ (2) | $CH_3$ (6) |

In analogous manner to the procedure described in Example 1, further 1:2 cobalt complex mixtures comprising complexes of the two monoazo dyestuffs of formulae I and II of Examples 1 to 13 in varying ratios 30:70, 70:30, 40:60, 60:40 may be prepared. The dyestuff mixtures are also water soluble and give dyeings similar to those given by the mixtures of Examples 1 to 13. Further 1:2 cobalt complex mixtures comprising complexes of compounds (I) and (II), as indicated in Table 2, may be prepared in analogy with the procedure described in Example 1. The dyestuffs are in the form of sodium salts and have good water solubility. They also give dyeings of reddish-yellow shades on natural and synthetic polyamides having notable wet and light-fastnesses.

| Example No. | Monoazo Compounds (I) | | | Monoazo Compounds (II) | | | Ratio (I):(II) |
|---|---|---|---|---|---|---|---|
| | $R_1$ | $R_2$ (position) | $R_3$ (position) | $R_1$ | $R_2$ (position) | $R_3$ (position) | |
| 14 | $CH_3$ | H | Cl (2) | H | H | Cl (2) | 50:50 |
| 15 | | | | | | | 40:60 |
| 16 | | | | | | | 60:40 |
| 17 | | | | | | | 30:70 |
| 18 | | | | | | | 70:30 |
| 19 | H | H | H | H | H | Cl (2) | 50:50 |
| 20 | | | | | | | 45:55 |
| 21 | | | | | | | 55:45 |
| 22 | | | | | | | 25:75 |
| 23 | | | | | | | 75:25 |
| 24 | $CH_3$ | H | H | H | H | Cl (2) | 40:60 |
| 25 | | | | | | | 50:50 |
| 26 | | | | | | | 60:40 |
| 27 | H | H | $OCH_3$ (2) | H | H | H | 50:50 |
| 28 | | | | | | | 35:65 |
| 29 | | | | | | | 65:35 |
| 30 | | | | | | | 20:80 |
| 31 | $CH_3$ | H | $OCH_3$ (2) | H | H | $OCH_3$(2) | 50:50 |
| 32 | | | | | | | 40:60 |
| 33 | | | | | | | 60:40 |
| 34 | | | | | | | 50:50 |
| 35 | | | | | | | 40:60 |

-continued

| Example No. | Monoazo Compounds (I) $R_1$ | $R_2$ (position) | $R_3$ (position) | Monoazo Compounds (II) $R_1$ | $R_2$ (position) | $R_3$ (position) | Ratio (I):(II) |
| --- | --- | --- | --- | --- | --- | --- | --- |
| 36 | H | H | H | H | OCH$_3$ (2) | CH$_3$ (5) | 60:40 |
| 37 |   |   |   |   |   |   | 35:65 |
| 38 |   |   |   |   |   |   | 65:35 |
| 39 | CH$_3$ | OCH$_3$ (2) | OCH$_3$ (5) | H | OCH$_3$ (2) | OCH$_3$ (5) | 50:50 |
| 40 |   |   |   |   |   |   | 25:75 |
| 41 |   |   |   |   |   |   | 75:25 |
| 42 | H | H | Cl (2) | H | H | Cl (4) | 50:50 |
| 43 |   |   |   |   |   |   | 40:60 |
| 44 |   |   |   |   |   |   | 30:70 |
| 45 |   |   |   |   |   |   | 60:40 |
| 46 |   |   |   |   |   |   | 70:30 |
| 47 | H | H | Cl (2) | CH$_3$ | H | Cl (2) | 50:50 |
| 48 |   |   |   |   |   |   | 30:70 |
| 49 |   |   |   |   |   |   | 70:30 |
| 50 | H | H | Cl (2) | H | H | OCH$_3$ (2) | 50:50 |
| 51 |   |   |   |   |   |   | 40:60 |
| 52 |   |   |   |   |   |   | 60:40 |
| 53 | H | H | H | H | Cl (2) | Cl (5) | 50:50 |
| 54 |   |   |   |   |   |   | 65:35 |
| 55 |   |   |   |   |   |   | 35:65 |
| 56 |   |   |   |   |   |   | 30:70 |

APPLICATION EXAMPLE A

1 Part of the 1:2 cobalt complex mixture of Example 1 is dissolved in 3000 parts water and 2 parts ammonium sulphate are added thereto. Subsequently, pre-moistened material (50 parts wool gaberdine or 50 parts nylon satin) is put in the bath which is heated over a period of 30 minutes to boiling temperature. The material is dyed for a further 30 minutes, any evaporated water being replaced. Subsequently, the dyed material is rinsed and after drying, a reddish-yellow dyeing having notable wet and light-fastnesses is obtained. The dyestuff mixtures of Examples 2–56 may be employed for dyeing in analogous manner.

APPLICATION EXAMPLE B 0.5 Parts of the 1:2 cobalt complex mixture of Example 1 and 0.5 parts of C.I. Acid Brown 363 are dissolved in 3000 parts of water and 2 parts aminosulphate are added thereto. Subsequently, pre-moistened material (50 parts wool gaberdine or 50 parts nylon satin) are put in the bath which is heated over a period of 30 minutes to boiling temperature. The further dyeing is carried out as described in Example A. After drying, a yellow brown dyeing having notable light and wet fastnesses is obtained.

The dyestuff mixtures of Examples 2 to 56 may be employed for combination dyeings in accordance with the same procedure.

APPLICATION EXAMPLE C

Polyamide fabric is printed with a printing paste containing:
  30 parts dyestuff complex mixture of Example 1,
  50 parts urea,
  50 parts dissolving agent (e.g. thiodiethylene glycol),
  300 parts water,
  500 parts thickening agent (e.g. based on locust bean gum),
  60 parts acid donating agent (ammonium tartrate), and
  60 parts thiourea.

The printed textile goods are steamed for 40 minutes at 102° (saturated steam), then rinsed with cold water, washed for 5 minutes at 60° with a dilute solution of conventional detergent and rinsed again. A reddish-yellow print having notable wet and light-fastnesses is obtained.

In analogous manner printing paste may be prepared using any one of the dyestuff mixtures of Examples 2 to 56.

What is claimed is:

1. A mixture of symmetrical and asymmetrical 1:2 cobalt complexes of a mixture of a compound of the formula

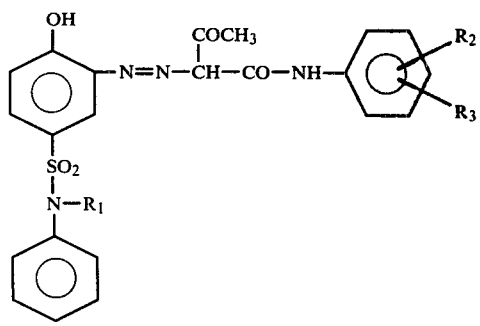

and a compound of the formula

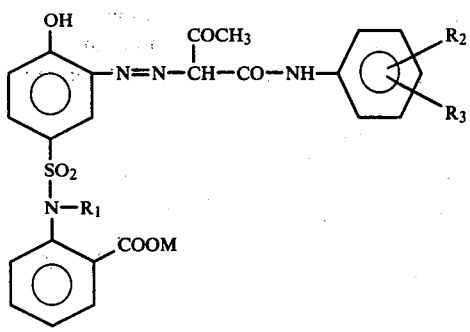

the molar ratio of the former to the latter being 4:1 to 1:4, wherein
  each $R_1$ is independently hydrogen or $C_{1-4}$ alkyl,
  each $R_2$ and $R_3$ is independently hydrogen, halo, $C_{1-4}$ alkyl or $C_{1-4}$ alkoxy,
  M is hydrogen or a non-chromophoric cation, and
  the negative charge of the complex anion of each 1:2 cobalt complex is balanced by hydrogen or a non-chromophoric cation.

2. A mixture according to claim 1 wherein
  M is sodium, and
  the negative charge of the complex anion of each 1:2 cobalt complex is balanced by sodium.

3. A mixture according to claim 1 wherein said molar ratio is 7:3 to 3:7.

4. A mixture according to claim 3 wherein said molar ratio is 3:2 to 2:3.

5. A mixture according to claim 4 wherein said molar ratio is 1:1.

6. A mixture according to claim 1 wherein each $R_1$ is independently hydrogen or methyl.

7. A mixture according to claim 1 wherein each $R_2$ is independently hydrogen, chloro, methyl, methoxy or ethoxy.

8. A mixture according to claim 7 wherein each $R_3$ is independently hydrogen, chloro, methyl, methoxy or ethoxy.

9. A mixture according to claim 8 wherein each $R_1$ is independently hydrogen or methyl.

10. A mixture according to claim 9 wherein said molar ratio is 1:1.

11. A mixture according to claim 10 wherein
  M is hydrogen, lithium, sodium, potassium or $N^{\oplus}(R_5)_4$, and
  the negative charge of the complex anion of each 1:2 cobalt complex is balanced by hydrogen, lithium, sodium, potassium or $N^{\oplus}(R_5)_4$,
    wherein each $R_5$ is independently hydrogen, $C_{1-3}$ alkyl or $C_{2-4}$ hydroxyalkyl wherein the hydroxy group is in other than the 1-position, with the proviso that at least one $R_5$ is hydrogen or $C_{1-3}$ alkyl.

12. A mixture according to claim 11 wherein
  M is sodium, and
  the negative charge of the complex anion of each 1:2 cobalt complex is balanced by sodium.

13. A mixture according to claim 9 wherein each $R_1$ is hydrogen.

14. A mixture according to claim 9 wherein each $R_2$ is independently hydrogen, chloro, methyl or methoxy.

15. A mixture according to claim 14 wherein each $R_3$ is independently hydrogen, chloro, methyl or methoxy.

16. A mixture according to claim 15 wherein each $R_2$ is hydrogen.

17. A mixture according to claim 16 wherein each $R_1$ is hydrogen.

18. A mixture according to claim 17 wherein each $R_3$ is hydrogen, chloro, methyl or methoxy, with the proviso that the two $R_3$'s are identical.

19. A mixture according to claim 18 wherein the molar ratio of the compounds of the formulae

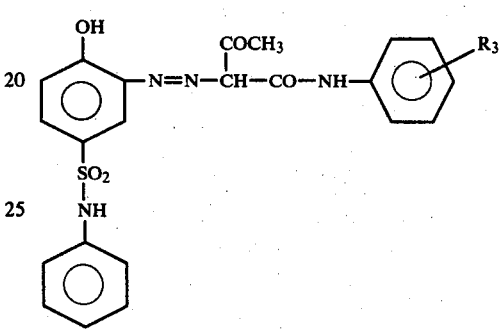

and

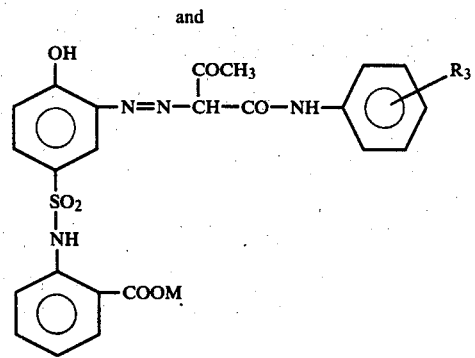

is 1:1.

20. A mixture according to claim 19 of symmetrical and asymmetrical 1:2 cobalt complexes of a mixture of the compound of the formula

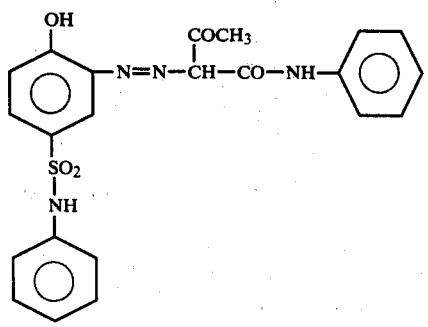

and a compound of the formula

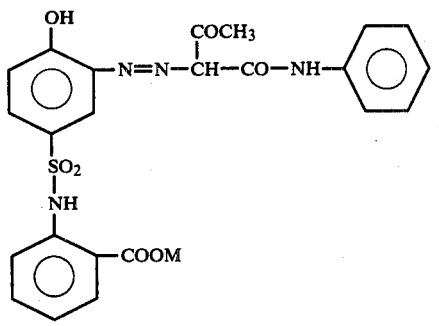

the molar ratio of the former to the latter being 1:1, wherein
M is hydrogen or a non-chromaphoric cation, and
the negative charge of the complex anion of each 1:2 cobalt complex is balanced by hydrogen or a non-chromophoric cation.

21. A mixture according to claim 20 wherein
M is sodium, and
the negative charge of the complex anion of each 1:2 cobalt complex is balanced by sodium.

22. A mixture according to claim 19 symmetrical and asymmetrical 1:2 cobalt complexes of a mixture of the compound of the formula

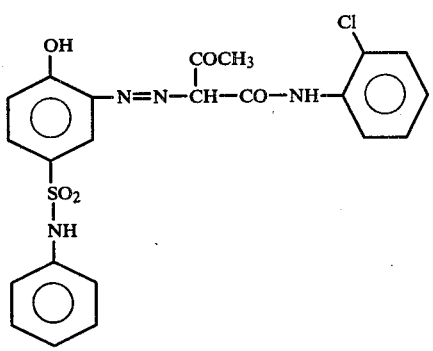

and a compound of the formula

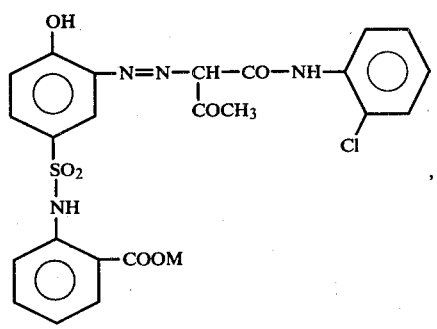

the molar ratio of the former to the latter being 1:1, wherein
M is hydrogen or a non-chromophoric cation, and
the negative charge of the complex anion of each 1:2 cobalt complex is balanced by hydrogen or a non-chromophoric cation.

23. A mixture according to claim 22 wherein
M is sodium, and
the negative charge of the complex anion of each 1:2 cobalt complex is balanced by sodium.

24. A mixture according to claim 19 of symmetrical and asymmetrical 1:2 cobalt complexes of a mixture of the compound of the formula

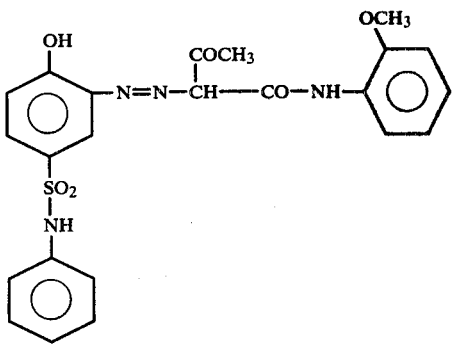

and a compound of the formula

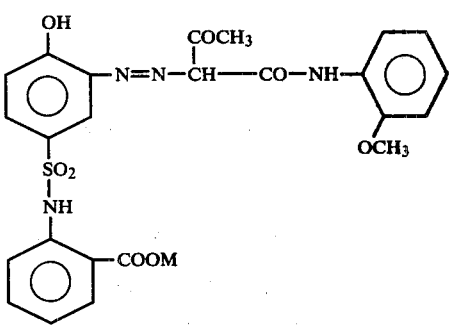

the molar ratio of the former to the latter being 1:1, wherein
M is hydrogen or a non-chromophoric cation, and
the negative charge of the complex anion of each 1:2 cobalt complex is balanced by hydrogen or a non-chromophoric cation.

25. A mixture according to claim 24 wherein
M is sodium, and
the negative charge of the complex anion of each 1:2 cobalt complex is balanced by sodium.

26. A mixture according to claim 15 of symmetrical and asymmetrical 1:2 cobalt complexes of a mixture of the compound of the formula

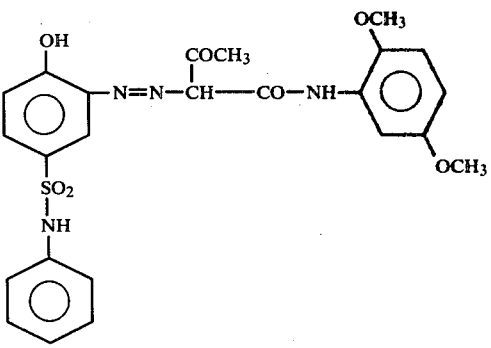

and a compound of the formula

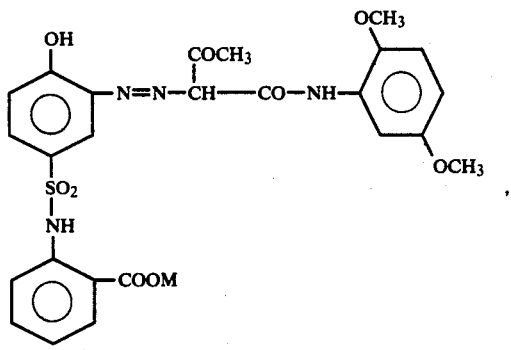

the molar ratio of the former to the latter being 1:1, wherein

M is hydrogen or a non-chromophoric cation, and the negative charge of the complex anion of each 1:2 cobalt complex is balanced by hydrogen or a non-chromophoric cation.

27. A mixture according to claim 26 wherein

M is sodium, and the negative charge of the complex anion of each 1:2 cobalt complex is balanced by sodium.

28. A mixture according to claim 15 of symmetrical and asymmetrical 1:2 cobalt complexes of a mixture of the compound of the formula

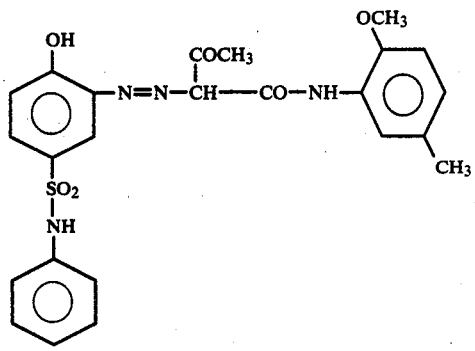

and a compound of the formula

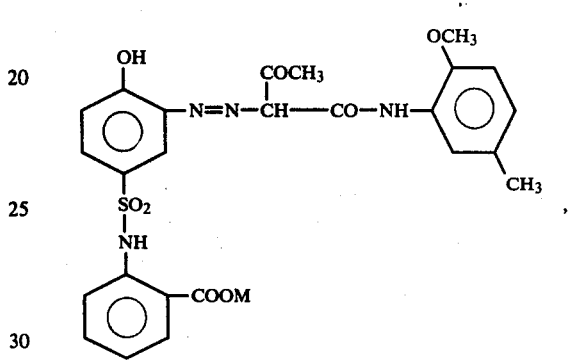

the molar ratio of the former to the latter being 1:1, wherein

M is hydrogen or a non-chromophoric cation, and
the negative charge of the complex anion of each 1:2 cobalt complex is balanced by hydrogen or a non-chromophoric cation.

* * * * *

UNITED STATES PATENT AND TRADEMARK OFFICE
CERTIFICATE OF CORRECTION

PATENT NO. : 4,165,314

DATED : August 21, 1979

INVENTOR(S) : Hanspeter Uehlinger

It is certified that error appears in the above—identified patent and that said Letters Patent is hereby corrected as shown below:

Column 1, line 48, "ration" should read -- ratio --.
Column 2, line 15, "$R_3$"'s," should read -- $R_3$"'s; --.
Column 2, line 64, "tetraolkanolannonium" should read -- tetra-alkanolammonium --. Column 5, line 6, delete "general". Column 5, line 27, delete both hyphens ("-"). Column 5, line 31 "comprises" should read -- comprise --. Column 6, line 5, delete the hyphen ("-"). Column 6, line 34, "light-" should read -- light --. Column 6, line 40, insert -- Table 2 -- above the first heavy solid line. Column 7, line 39, delete the hyphen ("-"). Column 8, line 45, delete the hyphen ("-"). Column 11, line 26, insert "of" after "19".

Signed and Sealed this

Seventeenth Day of June 1980

[SEAL]

Attest:

SIDNEY A. DIAMOND

Attesting Officer

Commissioner of Patents and Trademarks